United States Patent [19]

Aralt

[11] 3,870,168
[45] Mar. 11, 1975

[54] ASSEMBLY FOR PREVENTING THE ESCAPE OF DUST PARTICLES DURING A MORE OR LESS FLOWING TRANSFER OF POWDERED MATERIAL

[75] Inventor: Per Tybring Aralt, Hop, Norway

[73] Assignee: Kristian Gerhard Jebsen, Bergen, Norway

[22] Filed: Mar. 2, 1973

[21] Appl. No.: 337,307

[30] Foreign Application Priority Data
Mar. 6, 1972 Norway.................................. 692/72

[52] U.S. Cl.................................... 214/17, 209/147
[51] Int. Cl. ........................................ A01f 25/00
[58] Field of Search ............. 214/17 B, 17 C, 17 D; 209/147

[56] References Cited
UNITED STATES PATENTS
1,659,088  2/1928  Dowdall et al...................... 209/147
1,994,832  3/1935  Osgood ............................. 214/17 B
3,405,820  10/1968  Mori................................ 214/17 B Primary Examiner—Albert J. Makay
Assistant Examiner—Gary Auton
Attorney, Agent, or Firm—Watson Leavenworth Kelton & Taggart

[57] ABSTRACT

An assembly for preventing the escape of dust particles during a more or less flowing transfer of powdered and like material. A receiving means has an opening at its top edge sufficient to permit ready introduction and lowering down into the interior of the receiving means, as well as subsequent removal therefrom, of supply means for the material. A housing for emitting a jet of compressed air and a vacuum housing are arranged opposite each other and adjacent the top edge of the receiving means whereby an air jet carpet can be formed between said housings serving as a blocking layer to minimize the risk of the escape of clouds of dust particles during unloading of the powdered material.

4 Claims, 3 Drawing Figures

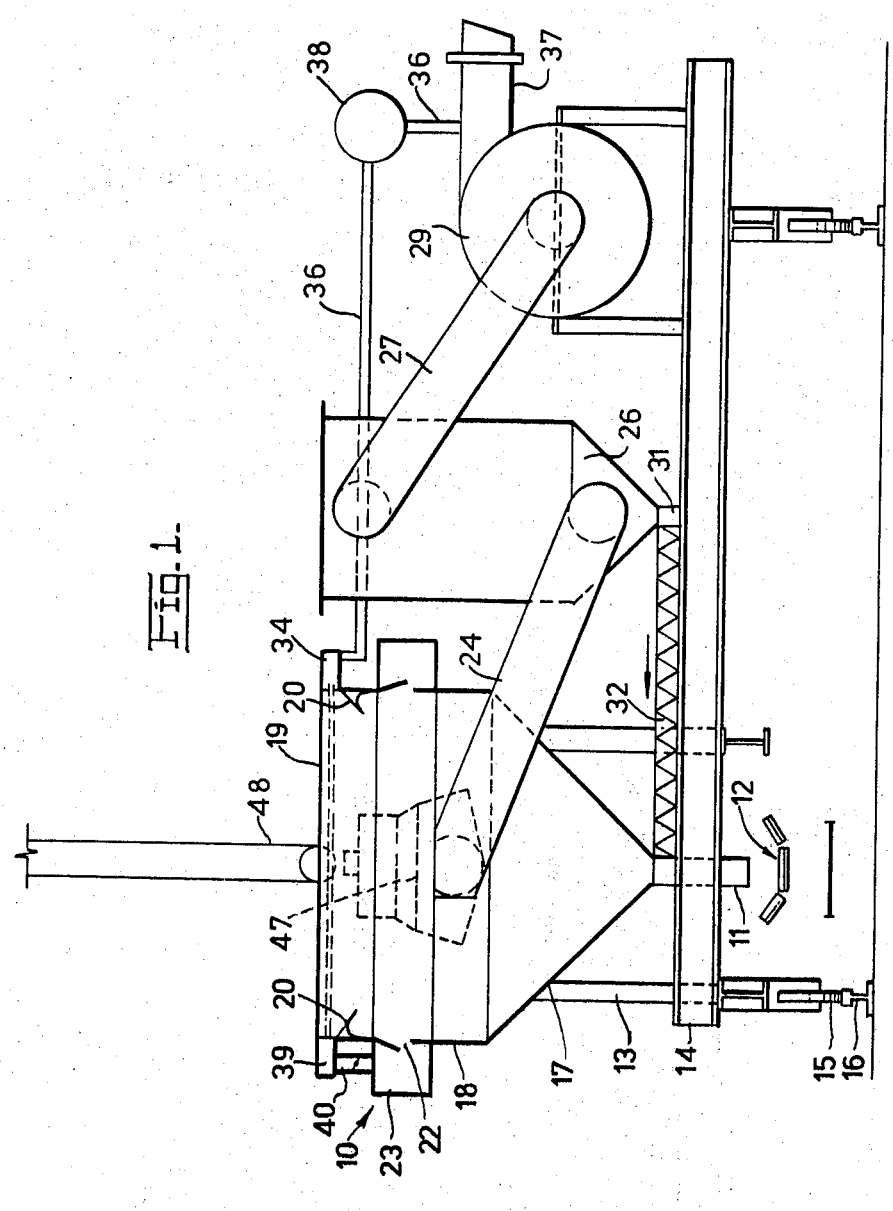

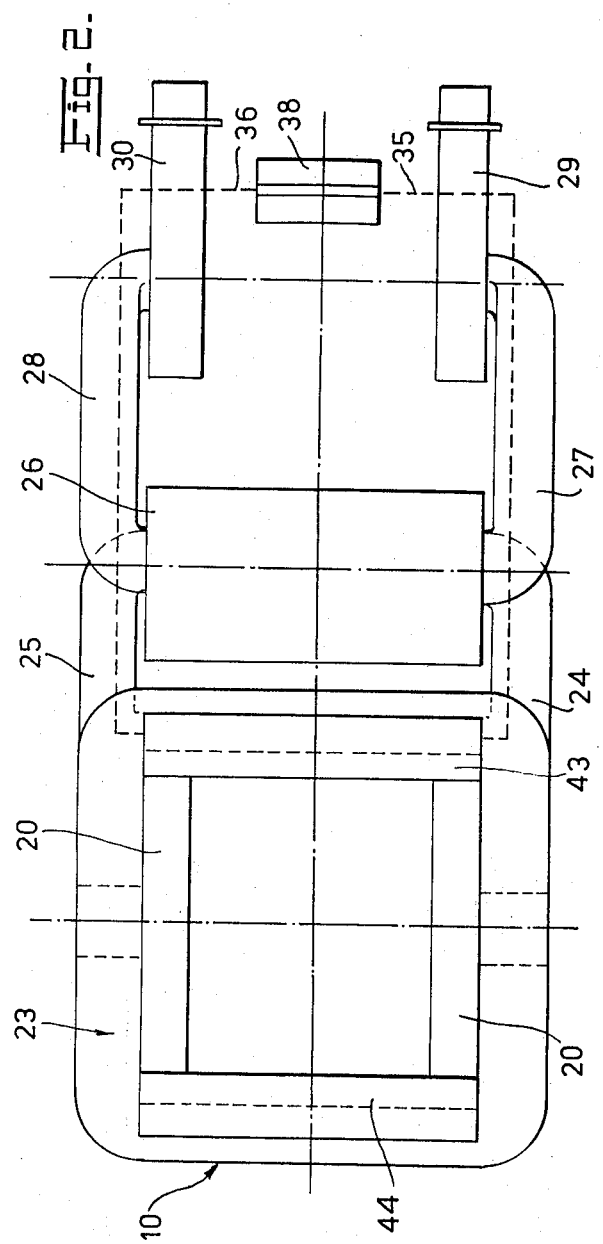

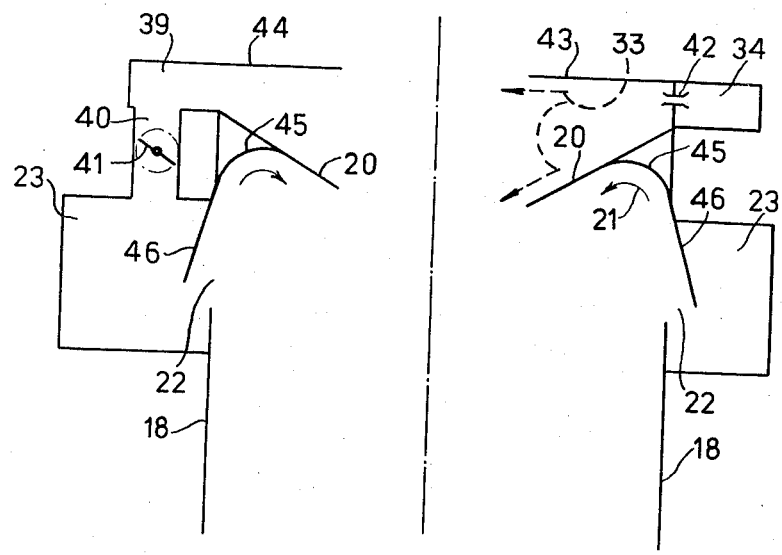

ASSEMBLY FOR PREVENTING THE ESCAPE OF DUST PARTICLES DURING A MORE OR LESS FLOWING TRANSFER OF POWDERED MATERIAL

This invention relates to an assembly for preventing the escape of dust particles during a more or less flowing transfer of powdered or similar material, such as cement.

It has been a big problem to prevent the escape of dust particles on transferring material which can produce clouds of dust and which is transported in bulk form by ship or in another manner. In certain instances such formations of clouds of dust can entail a not insignificant loss of quantities of material during the transportation operation. However, there often results a still greater problem in the contamination of the environment which is brought about by such an escape of dust particles, and in certain instances it is of decisive importance that the transportation or the transfer can be effected, for example, between a ship and a land installation with the formation of the least dust possible.

According to the present invention an assembly for preventing the escape of dust particles during a more or less flowing transfer of powdered and like material comprises a receiving means which has an opening at its top edge sufficient to permit the ready introduction and lowering into the interior of the receiving means, as well as subsequent removal therefrom, of supply means for the material, said receiving means having a funnel-shaped lower portion and an upper portion bounded by upstanding walls, the upper portion having below said top edge guard members sloping downwards and inwards from opposite upstanding walls in the general direction of the centre of said funnel-shaped lower portion and below said guard members and above said lower portion the walls of the upper portion being formed with openings, a surrounding vacuum duct communicating with said upper portion by way of said openings, a dust filter having its lower end connected to said vacuum duct via first suction conduits disposed on opposite sides of said receiving means, vacuum fans connected to the upper end of said dust filter via second suction conduits, a housing for emitting a jet of compressed air formed adjacent the top edge and on the one side of said upper portion, said housing being connected to the pressure side of said vacuum fans, a vacuum housing communicating with said vacuum duct and arranged opposite said compressed air housing and adjacent said top edge of said upper portion whereby an air jet carpet can be formed between said housings serving as a blocking layer to minimise the risk of the escape of clouds of dust particles during unloading of the powdered material.

The supply means can consist, for example, of a grab or, if desired, a transport pipe, which is adapted to be lowered down into the receiving means. The receiving means can be connected in a conventional manner to a conveyor means for further transport of the material from the receiving means to a storage location or the like. According to the invention the assembly can find application in various types of installations having a more or less flowing transfer of material, for example in the batch-wise transfer with grabs or with the more or less continuously flowing transfer with a conveyor pipe to the receiving means.

By employing guard members sloping downwardly and inwardly from the opposite upstanding walls, the forcing out of the receiving means of a large proportion of the masses of dust swirled up in the receiving means can be counteracted, but with the strong demands which are gradually placed with respect to a dust-free transfer in such receiving means, there is a marked need for being able to counteract still further any outward forcing of the swirled masses of dust from the receiving means.

With the combination of (a) the sloping guard members known per se which leads the clouds of dust formed in the receiving means back to the lower portion of the receiving means and with this forms a significant swirling effect within the receiving means, and (b) the surrounding vacuum duct arranged at a level below the guard members, one can ensure that the formation of clouds of dust can be kept in check in the vacuum hollow space formed in the receiving means and effectively removed gradually via the vacuum duct.

The forcing out of the masses of dust from the receiving means can be further counteracted by providing the latter, at a level just above the sloping guard members with the air jet carpet across the receiving means, between compressed air jet housing and the opposite vacuum housing.

In order that the invention can be more clearly understood, a convenient embodiment thereof will now be described, by way of example, with reference to the accompanying drawings in which:

FIG. 1 is a side view of the assembly according to the invention in combination with a supply means in the form of a grab which is lowered into the receiving means, FIG. 2 is a plan of the assembly of FIG. 1, and FIG. 3 is a schematic representation of details of the upper portion of the receiving means.

Referring to FIGS. 1 and 2, a receiving means 10 has a lower guide pipe 11 which discharges onto a conveyor belt 12. The receiving means 10 rests on a stand 13 on a wagon 14 which via wheels 15 rolls on rails 16 which extend parallel to the conveyor belt 12 so that the receiving means can be displaced longitudinally relative to the conveyor belt 12.

The receiving means 10 comprises a funnel-shaped lower portion 17 and an upper vertical wall portion 18 disposed above. A distance below the top edge 19 of the vertical portion 18, there extends a guard 20 sloping downwards and inwards towards the central portion of the funnel which serves the purpose of guiding the currents flowing upwardly along the portion 18 in a deflected manner back towards the central portion of the funnel. The guard 20 produces a certain swirling effect as indicated by the arrows 21 (see FIG. 3).

At a suitable level below the guard 20 and above the funnel portion 17, there are formed in the upper vertical wall portion 18, openings 22 to an annularly enclosing vacuum duct 23 which via suction pipes 24, 25 on opposite sides of the receiving means is connected to the lower end of a dust filter 26. The upper end of the dust filter is connected via further suction pipes 27, 28 to two parallel vacuum fans 29, 30. From the lower end of the filter extends a dust discharge pipe 31 to a conveyor screw 32 which feeds the dust separated from the filter to the guide pipe 11 from the receiving means for transfer to the conveyor belt 12.

The filter 26, vacuum fans 29, 30 and associated equipment together with associated driving means for the fans, are secured to the wagon 14.

At the upper edge 19 of the vertical wall portion 18, there is formed, on the one side, a compressed air jet housing 34 which, via a pair of conduits 35, 36, is connected to the pressure side 37 of the vacuum fans 29, 30. In the conduits 35, 36 there is inserted an extra air compressor 38. Directly opposite the compressed air jet housing 34, there is arranged an oppositely directed vacuum housing 39 which, via a conduit connection 40 having a built-in control flap 41, is connected to the vacuum duct 23 disposed below. Between the housings 34 and 39, there is formed an air jet carpet as indicated by the arrows 33.

In FIG. 3, there is indicated one of a series of nozzle openings 42 which discharge outwards from the housing 34 between an upper, substantially horizontal guide guard 43 and a lower, obliquely extending guide guard formed by the guard 20. In front of the vacuum housing 39 there extends similarly an upper substantially horizontal guide guard 44 and a lower, obliquely extending guide guard formed by the guard 20.

From FIG. 3, it is also evident that the guide guard 20 below is rounded off with a portion 45 which is extended obliquely downwards and inwards into the vacuum duct 23 with a guide plate 46.

In FIG. 1, there is shown, in dotted lines, a supply means in the form of a loading grab 47 which is supported by support lines 48 and is manoeuvred in a manner known per se. The grab is lowered down substantially to the position which is illustrated in FIG. 1 before it is opened and empties its contents in the lower funnel-shaped portion 17. The displacement of air which occurs as a result produces unavoidably an upwardly directed air stream which has a tendency to carry with it dust particles from the mass which are to be emptied into the funnel portion 17. By means of the guide guard 20 one can manage to guide the upwardly directed air stream thus formed, with a deflection effect, back to the funnel portion. By means of the vacuum effect which is produced in the upper portion of the receiving means via the vacuum duct 23, the holding back of the upwardly directed air stream in the receiving means and the removal, by degrees, of the dust cloud formed in the receiving means via the vacuum duct 23 is contributed to.

By utilising the jet air carpet which is emitted from the compressed air jet housing 34 as a blocking layer above the upper opening of the receiving means, the forcing out of the receiving means of the dust cloud-forming air stream can be counteracted effectively. By means of the upper horizontally extending guide guard 43 or 44, the withdrawal of the air jet carpet from the receiving means can be counteracted since by regulating the flap 41 there can be attained a desirably strong flow effect from the housing 34 to the housing 39 which carries with it possible dust particles which have been forced into the air jet carpet. The guide guard 20 extending slopingly downwards from the housing 34, permits at least certain portions of the air jet carpet to be bent downwards in the receiving means and thereby carries upwardly flowing masses of dust with it down into the receiving means and further inwards into the vacuum duct 23. By regulating the flap 41, a smaller or larger portion of the air jet carpet can be forced downwards into the receiving means and from there directly into the vacuum duct 23.

Instead of grabs there can be utilised as supply means, for example, a feed pipe which supplies the material to the receiving means in a more or less continuous flow.

In certain circumstances, the receiving means can be provided with a sideways opening admission opening instead of or, if desired, in addition to an upwardly opening admission opening and such a sideways opening admission opening can be provided with an air jet carpet so as to prevent the escape of dust in a manner similar to that which is described for the upwardly opening admission opening.

What I claim is:

1. An assembly for preventing the escape of dust particles from a hopper having upstanding walls during transfer thereto of powdered material and the like from a powdered material supply means, said assembly comprising baffles located interiorily of said hopper adjacent the top thereof and defining an access opening in said hopper to permit entry thereto of said powdered material supply means, said baffles extending downwardly and inwardly of said hopper to deflect any movement of dust particles away from said access opening, first and second opposedly directed housing components disposed at the top of said hopper at a location above said baffles, a source of compressed air, conduit means for comunicating compressed air from said source to the first of said housing components, said first housing component including means for directing a curtain flow of compressed air therefrom across said hopper access opening in the direction of said second housing component, said second housing component being open to permit entry of compressed air thereto, a duct encircling an upper portion of said hopper, means for maintaining a condition of vacuum in said duct, and means for establishing communication between said duct and both the interior of said hopper and said second housing component.

2. The assembly according to claim 1, wherein the first housing component and the second housing component have substantially horizontal guard members extending outwardly therefrom into the access opening adjacent the top of the hopper and above the baffles.

3. The assembly according to claim 1, wherein the baffle members are formed with a branch portion which initially is curved and then extends obliquely downwards and outwardly of said hopper into said duct as a guide plate defining with the walls of the upper portion of the hopper openings communicating said hopper to said duct and wherein the second housing component is connected to the duct by a conduit designed with a control flap, regulation of said flap governing the flow of air from the first housing component to the second housing component and in association with the baffles directing portions of the air curtain flow to be forced downwards into the hopper and thence into the duct.

4. The assembly of claim 1 in which the vacuum maintaining means comprises a suction fan having an inlet in communication with said suction duct, outlet from said suction fan comprising said source of compressed air.

* * * * *